E. C. ATKINS.
ATTACHING HANDLES TO SAWS.
No. 30,906. Patented Dec. 18, 1860.
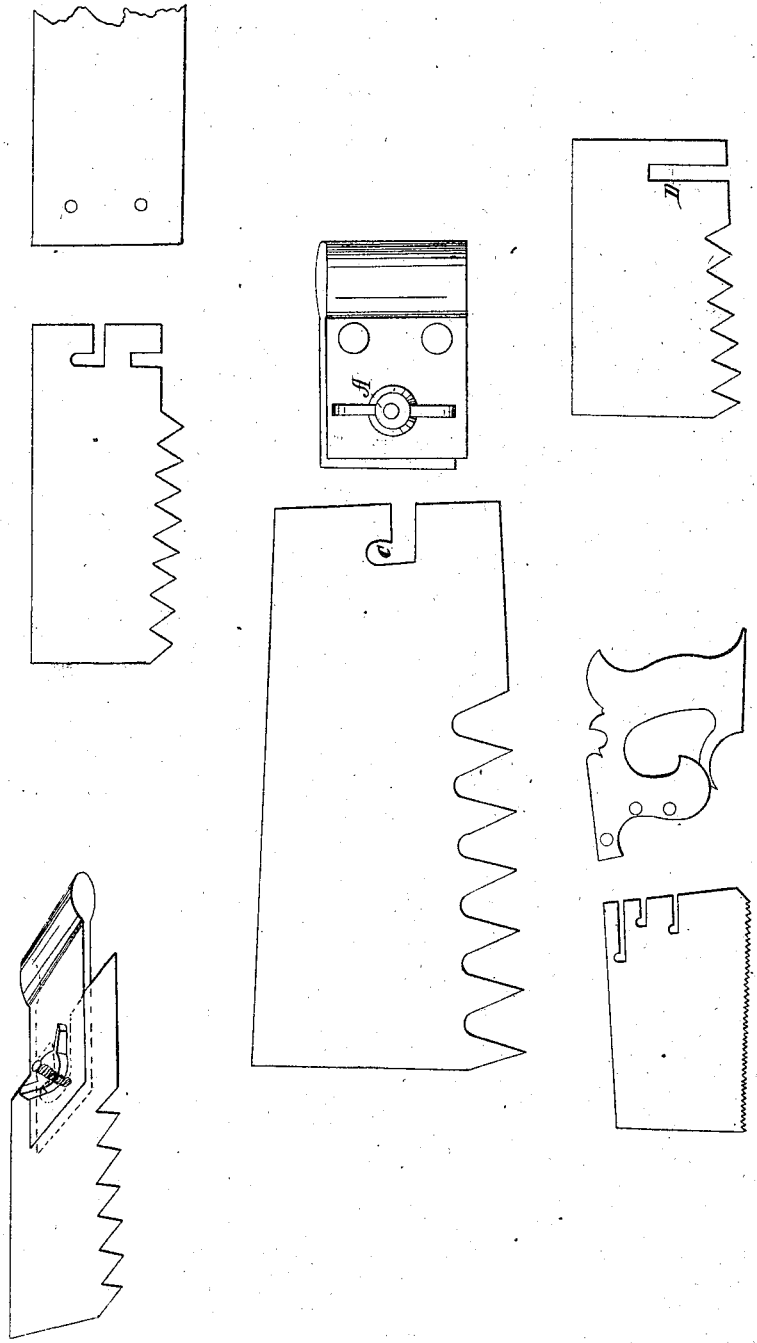

UNITED STATES PATENT OFFICE.

ELIAS C. ATKINS, OF INDIANAPOLIS, INDIANA.

METHOD OF ATTACHING THE HANDLE TO SAWS.

Specification of Letters Patent No. 30,906, dated December 18, 1860.

*To all whom it may concern:*

Be it known that I, ELIAS C. ATKINS, of Indianapolis, county of Marion, and State of Indiana, have invented a new and Improved Method of Attaching Tangs or Ears to Crosscut-Saws; and I do hereby declare that the following is a full and exact description thereof, reference being had to the accompanying drawings and to the letters of reference marked thereon.

It has always been a matter of difficulty in using crosscut saws for cutting heavy timber. In many instances to remove the saw after the log is cut through, as, from the uneven nature of the ground the log closes together at the top side, so that the saw cannot be removed, (or raised out,) only by raising the log by means of levers or wedges, removing the soil underneath, or by taking off the tang or ear on the end of the saw when it may be readily drawn out. In the ordinary mode of constructing crosscut saws the tangs are attached by means of rivets or screws passing through holes in the saw and tang or ear and they can only be separated by taking out the rivets or screws.

The object of the invention is to enable the operator to remove the tang or ear by simply loosening the nut A without taking out the bolt or screw. This is accomplished by inserting the open slot C in the end of the saw. The slot may be made in the end or in the edge of the saw near the end D. It may be made angular or straight. This plan accomplishes the object cheaply, thus placing it within the reach of all persons using saws.

What I claim, and desire to secure by Letters Patent as my invention, is—

The attachment of the ear or tang to crosscut saws by means of a screw; and open slot passing in at the end, or on the edge of the saw near the end.

ELIAS C. ATKINS. [L. S.]

In presence of—
C. L. HOWARD,
C. W. LANE.